(12) United States Patent
Sugitani et al.

(10) Patent No.: US 8,281,836 B2
(45) Date of Patent: Oct. 9, 2012

(54) RUN FLAT TIRE

(75) Inventors: Kenichiro Sugitani, Hiratsuka (JP);
Yoshimasa Hashimoto, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 635 days.

(21) Appl. No.: 12/097,010

(22) PCT Filed: Jan. 24, 2007

(86) PCT No.: PCT/JP2007/051100
§ 371 (c)(1),
(2), (4) Date: Jun. 11, 2008

(87) PCT Pub. No.: WO2007/086436
PCT Pub. Date: Aug. 2, 2007

(65) Prior Publication Data
US 2009/0165916 A1 Jul. 2, 2009

(30) Foreign Application Priority Data

Jan. 27, 2006 (JP) .................................. 2006-019179
Feb. 10, 2006 (JP) .................................. 2006-033440

(51) Int. Cl.
*B60C 9/18* (2006.01)
*B60C 9/20* (2006.01)
*B60C 17/00* (2006.01)

(52) U.S. Cl. ........ 152/526; 152/516; 152/517; 152/534; 152/535

(58) Field of Classification Search ................... 152/526, 152/527, 528, 529, 530, 531, 532, 533, 534, 152/535, 536, 537, 538
See application file for complete search history.

(56) References Cited

U.S. PATENT DOCUMENTS 3,543,828 A * 12/1970 Caille et al. .................... 152/535
4,934,429 A * 6/1990 Koseki et al. .................. 152/538
(Continued)

FOREIGN PATENT DOCUMENTS
JP    A 3-104710    5/1991
(Continued)

OTHER PUBLICATIONS

Machine translation of JP 07195905, 1995.*

*Primary Examiner* — Justin Fischer
(74) *Attorney, Agent, or Firm* — Greer, Burns & Crain, Ltd.

(57) ABSTRACT

Provided is a run flat tire having an enhanced ride comfort in running on general road surfaces and an enhanced driving stability on snowy road surfaces at the time when the tire is not punctured, as well as an enhanced maneuverability, particularly starting ability, on icy road surfaces in run-flat running where the tire is punctured. Three belt layers (8, 9, 10) are disposed on an outer circumferential side of a carcass layer (6) in a tread portion (4). In addition, as to the three belt layers, the cord angle α of the innermost belt layer (8) with respect to a circumferential direction of the tire is set at 15° to 30°, the cord angle β of the intermediate belt layer (9) with respect to the circumferential direction of the tire is set at not less than 40°, and the cord angle γ of the outermost belt layer (10) with respect to the circumferential direction of the tire is set at 35° to 70°.

10 Claims, 5 Drawing Sheets

U.S. PATENT DOCUMENTS

| | | | |
|---|---|---|---|
| 5,082,042 A * | 1/1992 | Kobayashi et al. | 152/535 |
| 5,353,856 A * | 10/1994 | Kishi et al. | 152/209.14 |
| 5,465,773 A * | 11/1995 | Kadota et al. | 152/454 |
| 5,591,284 A * | 1/1997 | Gaudin | 152/532 |
| 5,772,810 A | 6/1998 | Cluzel | |
| 6,230,773 B1 * | 5/2001 | Sandstrom et al. | 152/517 |
| 6,401,778 B1 | 6/2002 | Cluzel | |
| 6,615,889 B1 * | 9/2003 | Nakata | 152/526 |
| 2003/0102067 A1 | 6/2003 | Okamoto et al. | |

FOREIGN PATENT DOCUMENTS

| | | |
|---|---|---|
| JP | A 4-300702 | 10/1992 |
| JP | 07195905 * | 8/1995 |
| JP | A 8-216634 | 8/1996 |
| JP | A 9-512226 | 12/1997 |
| JP | A 2000-185517 | 7/2000 |
| JP | A 2000-185518 | 7/2000 |
| JP | A 2001-47818 | 2/2001 |
| JP | A 2001-522748 | 11/2001 |
| JP | A 2003-63209 | 3/2003 |
| JP | A 2003-94912 | 4/2003 |
| JP | A 2003-94913 | 4/2003 |
| JP | A 2003-326924 | 11/2003 |
| JP | A 2004-161201 | 6/2004 |
| JP | A 2004-306680 | 11/2004 |
| JP | A 2005-186827 | 7/2005 |
| JP | A 2005-212742 | 8/2005 |
| WO | WO 03/024727 A1 | 3/2003 |

* cited by examiner

RUN FLAT TIRE

This application is a U.S. National Phase of International Application No. PCT/JP2007/051100 filed Jan. 24, 2007.

TECHNICAL FIELD

The present invention relates to a run flat tire. More specifically, the present invention relates to a run flat tire having an enhanced maneuverability, particularly starting ability, on icy road surfaces in run-flat running where the tire is punctured, while having an enhanced ride comfort in running on general road surfaces as well as an enhanced driving stability on snowy road surfaces at the time when the tire is not punctured.

BACKGROUND ART

Heretofore, the following run flat tire has been widely known that enables a safety driving for a certain distance even when the tire is punctured. In this run flat tire, hard rubber layers each having a crescent shape in the lateral cross section are disposed respectively in sidewall portions of the tire (for example, see Patent Documents 1 and 2). When punctured to have a pressure of zero, the run flat tire of this type is allowed to run with the crescent hard rubber layers, which are disposed respectively in the sidewall portions, supporting the load of the vehicle applied to the tire.

However, the run flat tire of this type has the following problem because the load of the vehicle is supported by the hard rubbers on both of the left and right sides as described above. Specifically, in run-flat running where the tire is punctured, the area of the contact patch of the tire is reduced because a center portion, in the width direction, of a tread portion 4 is buckled as shown in FIG. 5. Accordingly, the maneuverability in running on a low friction road surface is deteriorated. In particular, in the case of a tire, such as a studless tire, that is designed to have a tread with low stiffness, this tendency of the deterioration is significant, so that the tire is eventually slipped on icy road surfaces.

As a countermeasure against this problem, the following approach has been proposed. In this approach, a belt addition layer formed of cords each extending at a large angle to the circumferential direction of the tire is disposed on the outer circumferential side of two belt layers disposed in a tread portion. The belt addition layer increases the compression stiffness, in the width direction, of the tread portion, so that the buckling phenomenon is suppressed (see, for example, Patent Document 3).

However, this approach causes a significantly excessive increase in stiffness of the tread because three belt layers are formed in total. As a result, this approach brings about a problem that the ride comfort in running on general road surfaces and the driving stability on snowy road surfaces at the time when the tire is not punctured are deteriorated.

Patent Document 1: Japanese Patent Application Kokai Publication No. 2003-94912
Patent Document 2: Japanese Patent Application Kokai Publication No. 2003-326924
Patent Document 3: International Publication No. WO2003/024727

DISCLOSURE OF THE INVENTION

Problems to be Solved by the Invention

An object of the present invention is to provide a run flat tire having an enhanced maneuverability, particularly starting ability, on icy road surfaces in run-flat running where the tire is punctured, while having an enhanced ride comfort in running on general road surfaces as well as an enhanced driving stability on snowy road surfaces at the time when the tire is not punctured.

Means for Solving the Problems

A run flat tire of the present invention for achieving the above-described object is characterized by including: a carcass layer laid between bead cores buried respectively in a pair of left and right bead portions; hard rubber layers each having a substantially crescent shape in a cross section, and being disposed respectively in sidewall portions; and three belt layers disposed on an outer circumferential side of the carcass layer in a tread portion. In addition, the run flat tire has the following characteristics. As to the three belt layers, the cord angle $\alpha$ of the innermost belt layer with respect to a circumferential direction of the tire is set at 15° to 30°, the cord angle $\beta$ of the intermediate belt layer with respect to the circumferential direction of the tire is set at not less than 40°, and the cord angle $\gamma$ of the outermost belt layer with respect to the circumferential direction of the tire is set at 35° to 70°.

In the configuration of the belt layer, the angular difference between the cord angle $\beta$ of the intermediate belt layer and the cord angle $\gamma$ of the outermost belt layer may preferably be set to be within 20°. Moreover, the cord direction of the innermost belt layer and the cord direction of the intermediate belt layer may be arranged to be inclined respectively in directions opposite to each other with respect to an equatorial plane of the tire, while the cord direction of the intermediate belt layer and the cord direction of the outermost belt layer may be arranged to be inclined in the same direction with respect to the equatorial plane of the tire.

The cords constituting at least one of the intermediate belt layer and the outermost belt layer may be steel cords. In addition, the total cross-sectional area of the cords per unit width in at least one of the intermediate belt layer and the outermost belt layer may be set to be 1.2 to 1.5 times of the total cross-sectional area of the cords per unit width in the innermost belt layer.

Another run flat tire of the present invention for achieving the above-described object is characterized by including: a carcass layer laid between bead cores buried respectively in a pair of left and right bead portions; hard rubber layers each having a substantially crescent shape in a cross section, and being disposed respectively in sidewall portions; and three belt layers disposed on an outer circumferential side of the carcass layer in a tread portion. In addition, the run flat tire has the following characteristics. As to the three belt layers, the cord angle $\alpha$ of the innermost belt layer with respect to a circumferential direction of the tire is set at 40° to 75°, the cord angle $\beta$ of the intermediate belt layer with respect to the circumferential direction of the tire is set at 0° to 35°, and the cord angle $\gamma$ of the outermost belt layer with respect to the circumferential direction of the tire is set at 40° to 75°. Moreover, the cord direction of the innermost belt layer and the cord direction of the intermediate belt layer are arranged to be inclined respectively in directions opposite to each other with respect to an equatorial plane of the tire.

In the configuration of the second run flat tire, the relation between the cord angle $\alpha$ of the innermost belt layer and the cord angle $\gamma$ of the outermost belt layer may preferably be set to be $\alpha \geq \gamma$. In addition, the cord direction of the outermost belt layer and the cord direction of the intermediate belt layer may be arranged to be inclined in the same direction with respect to the equatorial plane of the tire.

Moreover, the cords constituting the innermost belt layer and the outermost belt layer may be steel cords.

In both of the first and second run flat tires, a relatively soft rubber having a JIS A hardness of 40 to 50 at the temperature of 0° C. may be used as a cap rubber constituting the tread portion. Furthermore, it is preferable that these run flat tires be employed as a studless tire for running on icy road surfaces.

Effect of the Invention

According to the first one of the present invention, the cord angle of each of the three belt layers, disposed in the tread portion, with respect to the circumferential direction of the tire is set as follows. Specifically, the cord angle $\alpha$ of the innermost belt layer is set at 15° to 30°, the cord angle $\beta$ of the intermediate belt layer is set at not less than 40°, and the cord angle $\gamma$ of the outermost belt layer is set at 35° to 70°. This configuration increases the compression stiffness, in the width direction, of the tread portion while suppressing an increase in out-of-plane stiffness in the circumferential direction as the entire belt layers. For this reason, while the ride comfort in running on general road surfaces and the driving stability in running on snowy road surfaces at the time when the tire is not punctured are enhanced, the buckling phenomenon in run-flat running where the tire is punctured is suppressed. Accordingly, because the area of the contact patch of the tire is secured, the maneuverability (particularly, the starting performance) on icy road surfaces can be enhanced.

According to the second one of the present invention, the cord angle of each of the three belt layers, disposed in the tread portion, with respect to the circumferential direction of the tire is set as follows. Specifically, each of the cord angle $\alpha$ of the innermost belt layer and the cord angle $\gamma$ of the outermost belt layer is set to be a high angle of 40° to 75°, and the cord angle $\beta$ of the intermediate belt layer is set to be a low angle of 0° to 35°. Moreover, the cord directions of the innermost belt layer and the intermediate belt layer are arranged to intersect each other with respect to an equatorial plane of the tire. This configuration makes it possible to secure, in a balanced manner, the out-of-plane stiffness in the width direction while suppressing an increase in out-of-plane stiffness in the circumferential direction as the entire belt layers. The compression stiffness, in the width direction, of the tread portion thus can be increased. For this reason, while the ride comfort in running on general road surfaces and the driving stability in running on snowy road surfaces at the time when the tire is not punctured are enhanced, the buckling phenomenon in run-flat running where the tire is punctured is suppressed. Accordingly, the maneuverability on icy road surfaces can be enhanced.

BEST MODES FOR CARRYING OUT THE INVENTION

Hereinafter, the configuration of the present invention will be described in detail with reference to the accompanying drawings.

Figure 1:
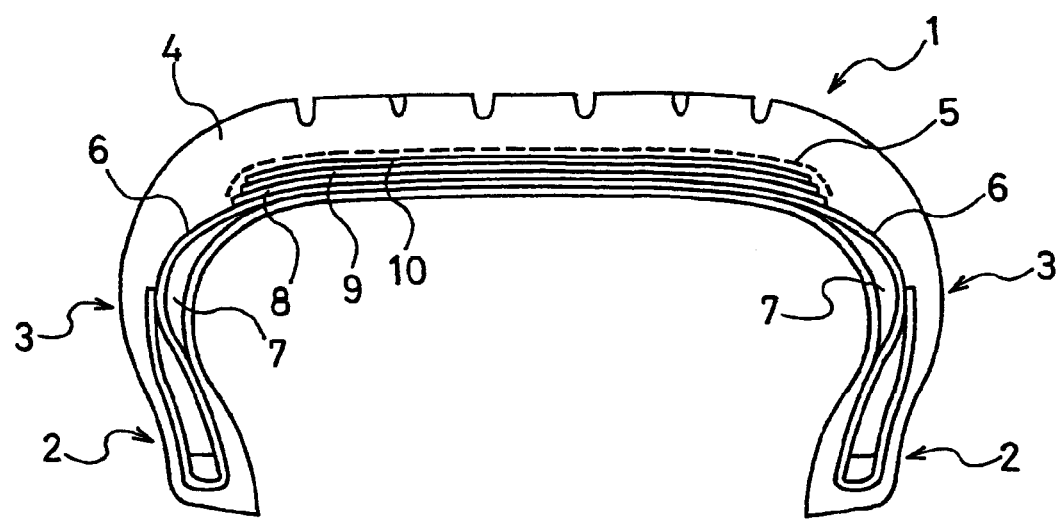
FIG. 1 is a cross-sectional view showing a run flat tire according to an embodiment of the present invention.
Figure 2:
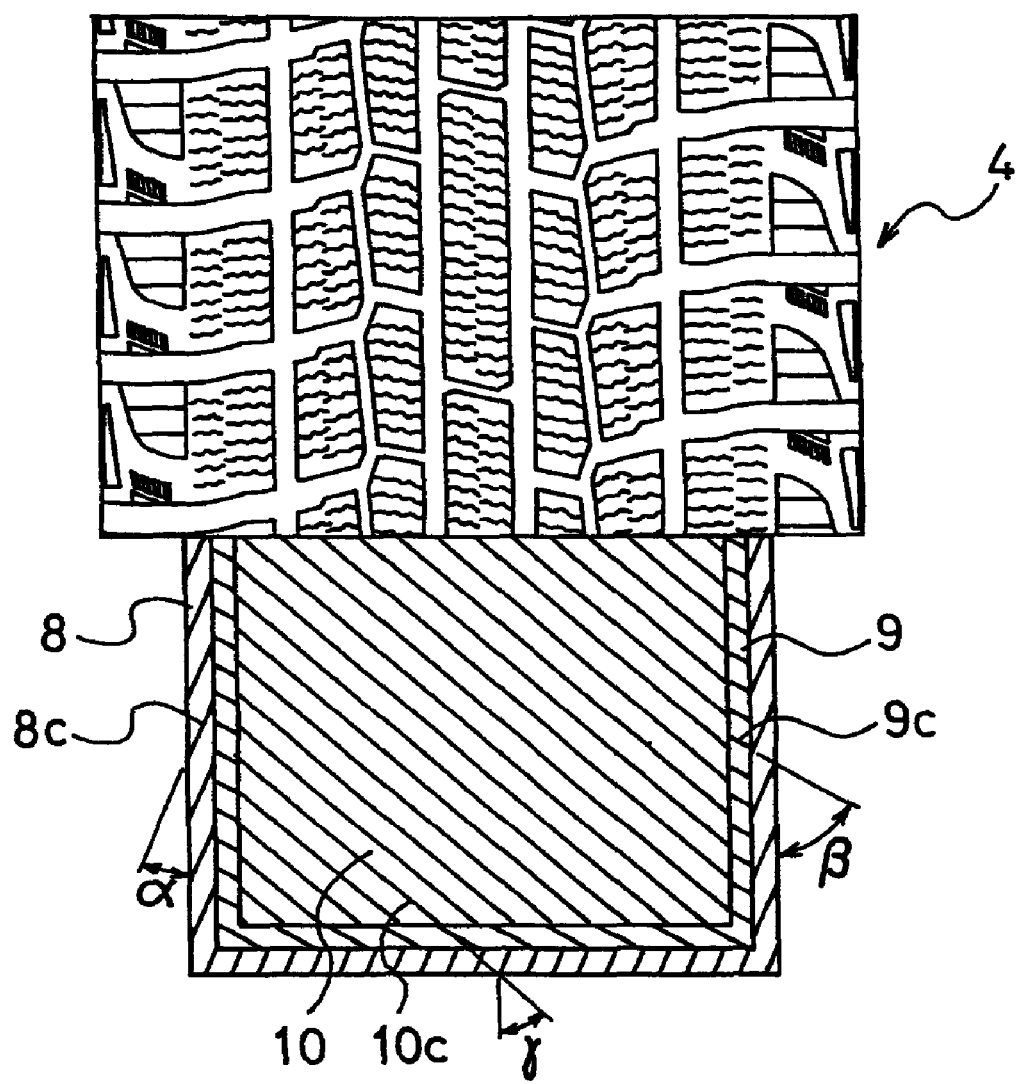
FIG. 2 is a partially-cut-away plan view showing the arrangement relationship between a tread surface and belt layers in the tire of FIG. 1.

In a run flat tire shown in FIG. 1 and FIG. 2, the run flat tire 1 includes: a pair of left and right bead portions 2 and 2; sidewall portions 3 and 3 which extend outward in the radial direction respectively from the bead portions 2 and 2; and a cylindrical tread portion 4 which link the outer sides, in the radial direction, of the respective sidewall portions 3 and 3 to each other.

A carcass layer 6 is laid between the pair of left and right bead portions 2 and 2. A hard rubber layer 7 is disposed on the inner side, in the axial direction of the tire, of the carcass layer 6, in each sidewall portion 3. Each hard rubber layer 7 has a substantially crescent shape in the lateral cross section. In addition, three belt layers 8, 9, and 10 are disposed on the outer circumferential side of the carcass layer 6, in the tread portion 4. Moreover, a belt cover layer 5 is disposed on the outer side of these belt layers 8, 9, and 10 in order to suppress expansion in diameter of these belt layers 8, 9, and 10 during high-speed running. The belt cover layer 5 is formed by winding an organic fiber cord made of Nylon or the like in such a manner that the organic fiber cord extends in the circumferential direction of the tire. The belt cover layer 5 is sometimes not disposed depending on the required characteristics of the tire.

As shown in FIG. 2, in the present embodiment, the surface of the tread portion 4 is formed in a block pattern having a large number of blocks arranged therein. The cord angles $\alpha$, $\beta$, and $\gamma$ of cords 8c, 9c, and 10c constituting the respective three belt layers 8, 9, and 10 with respect to the circumferential direction of the tire are set as follows. Specifically, the cord angle $\alpha$ of the innermost belt layer 8 is set at 15° to 30°. The cord angle $\beta$ of the intermediate belt layer 9 is set at not less than 40°, and preferably not more than 75°. The cord angle $\gamma$ of the outermost belt layer 10 is set at 35° to 70°, and preferably 40° to 65°.

The above-described settings of the cord angle $\alpha$ of the belt layer 8 at a low angle, and of each of the cord angles $\beta$ and $\gamma$ of the respective belt layers 9 and 10 at a high angle, provide the following effects. Specifically, these settings make it possible to balance up, as the entire belt layers, the out-of-plane stiffness in the circumferential direction and the out-of-plane stiffness in the width direction, thus increasing the compression stiffness of the tread portion in the width direction. Accordingly, it is possible to enhance the ride comfort in running on general road surfaces as well as the driving stability in running on snowy road surfaces at the time when the tire is not punctured, and also to enhance the maneuverability (particularly, the starting performance) on icy road surfaces in run-flat running where the tire is punctured because buckling in the tread surface is prevented from occurring.

When the cord angle $\alpha$ of the innermost belt layer 8 is less than 15°, the out-of-plane stiffness, in the circumferential direction, as the entire belt layers becomes too high. Accordingly, the ride comfort in running on general road surfaces and the driving stability in running on snowy road surfaces at the time when the tire is not punctured are deteriorated.

When the cord angle $\beta$ of the intermediate belt layer 9 is less than 40°, or when the cord angle $\gamma$ of the outermost belt layer 10 is less than 35°, the out-of-plane stiffness, in the circumferential direction, as the entire belt layers becomes too high as in the above-described case. Accordingly, the ride comfort in running on general road surfaces and the driving stability in running on snowy road surfaces at the time when the tire is not punctured are deteriorated.

Moreover, when the cord angle γ of the outermost belt layer 10 exceeds 70°, the out-of-plane stiffness, in the width direction, as the entire belt layers becomes too high as compared with the out-of-plane stiffness, in the circumferential direction. For this reason, the compression stiffness of the tread portion in the width direction becomes too high. Accordingly, the ride comfort in running on general road surfaces and the driving stability in running on snowy road surfaces at the time when the tire is not punctured are deteriorated.

The angular difference |β−γ| between the cord angle β of the cords 9c constituting the intermediate belt layer 9 and the cord angle γ of the cords 10c constituting the outermost belt layer 10 is preferably set to be within 20°, and more preferably within 10°. This setting reduces the difference in stiffness between the intermediate belt layer 9 and the outermost belt layer 10, and thus suppresses an excessive torsion of the belt layers. As a result, since the pull of the steering is suppressed, the straight-running performance can be enhanced.

Each of the cords 8c, 9c, and 10c respectively constituting the belt layers 8, 9, and 10 is preferably formed of steel cords or organic fiber cords having high strength and high modulus of elasticity. The organic fiber cord may be, for example, one of, or a bicomponent fiber including any of, an aramid fiber, a polyketone fiber, a polyethylene naphthalate fiber, and a poly (p-phenylene-benzobisoxazole) fiber, each having a tensile modulus of elasticity from 10,000 N/mm² to 150,000N/mm², and preferably from 20,000N/mm² to 100,000N/mm².

In the present embodiment, it is preferable that at least one of the intermediate belt layer 9 and the outermost belt layer 10 be formed of a steel cord. It is more preferable that both of these belt layers 9 and 10 be formed of a steel cord. This makes it possible to securely increase the compression stiffness of the tread portion 4 in the width direction. Accordingly, the buckling phenomenon in run-flat running can be securely suppressed. As a result, since the area of the contact patch of the tire is secured, the maneuverability (particularly, the starting performance) on icy road surfaces can be further enhanced.

The arrangement relationship of the cords 8c, 9c, and 10c constituting the respective belt layers 8, 9, and 10 may be set in the following manner, as shown in FIG. 2. Specifically, these belt layers 8, 9, and 10 are arranged in such a manner that the cord direction of the innermost belt layer 8 and the cord direction of the intermediate belt layer 9 are inclined respectively in directions opposite to each other with respect to the equatorial plane of the tire, and also that the cord direction of the intermediate belt layer 9 and the cord direction of the outermost belt layer 10 are inclined in the same direction with respect to the equatorial plane of the tire. This arrangement makes it possible to enhance, in a balanced manner, the ride comfort in running on general road surfaces and the driving stability in running on snowy road surfaces at the time when the tire is not punctured, as well as the maneuverability on icy road surfaces in run-flat running where the tire is punctured.

Figure 3:
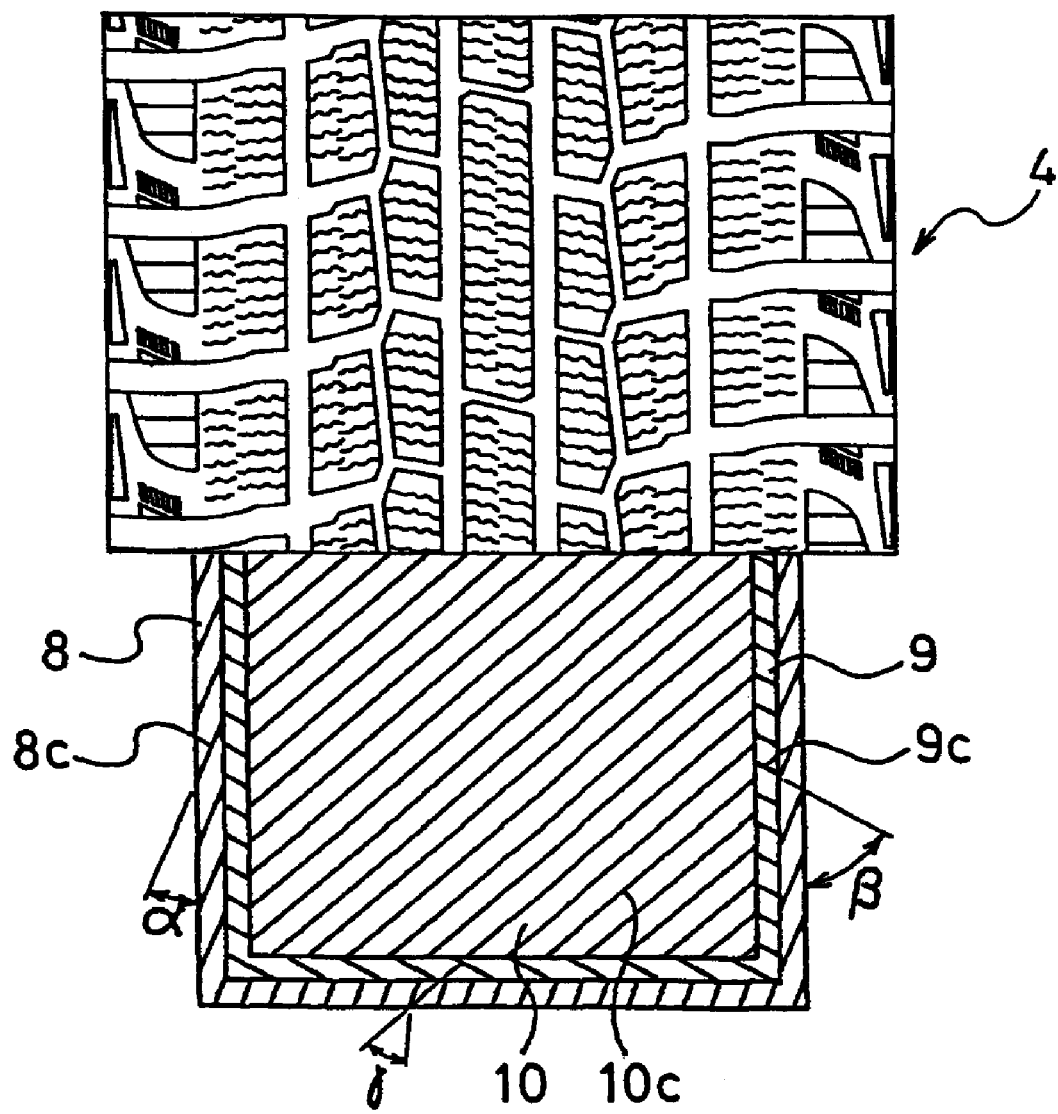
FIG. 3 is a plan view corresponding to FIG. 2 and showing a run flat tire according to another embodiment of the present invention.

It should be noted that the cord direction of the intermediate belt layer and the cord direction of the outermost belt layer 10 may be set as shown in FIG. 3, depending on the size and the required characteristics of the tire. Specifically, the intermediate belt layer 9 and the outermost belt layer 10 may be arranged in such a manner that the cord direction of the intermediate belt layer 9 and the cord direction of the outermost belt layer 10 are inclined respectively in directions opposite to each other with respect to the equatorial plane of the tire.

In the above-described embodiments, shown in FIG. 2 and FIG. 3, the total cross-sectional area of the cords included in each of the three belt layers is preferably set in the following manner. Specifically, it is preferable that the total cross-sectional area of the cords 9c or 10c per unit width, in at least one of the intermediate belt layer 9 and the outermost belt layer 10 be set to be 1.2 to 1.5 times of the total cross-sectional area of the cords 8c per unit width in the innermost belt layer 8. This setting makes it possible to further increase the compression stiffness of the tread portion 4 in the width direction. As a result, it is possible to further enhance the effect of suppressing the buckling phenomenon in run-flat running, and to thus further enhance the maneuverability (particularly, the starting performance) on icy road surfaces. Here, the total cross-sectional area of cords per unit width is the sum of cross-sectional areas of the cords per unit width, in a cross-section including the axis of the tire, in each belt layer.

Figure 4:
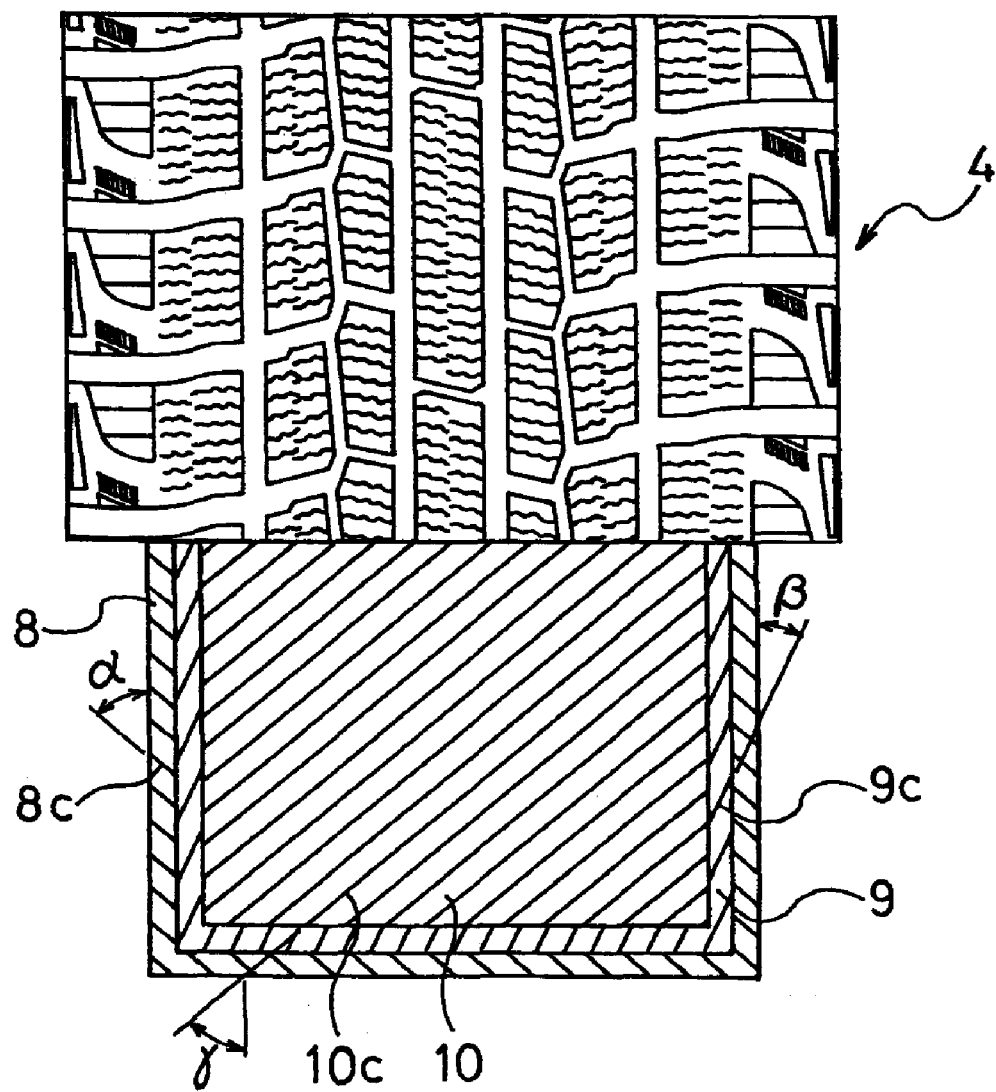
FIG. 4 is a plan view corresponding to FIG. 2 and showing a run flat tire according to still another embodiment of the present invention.
Figure 5:
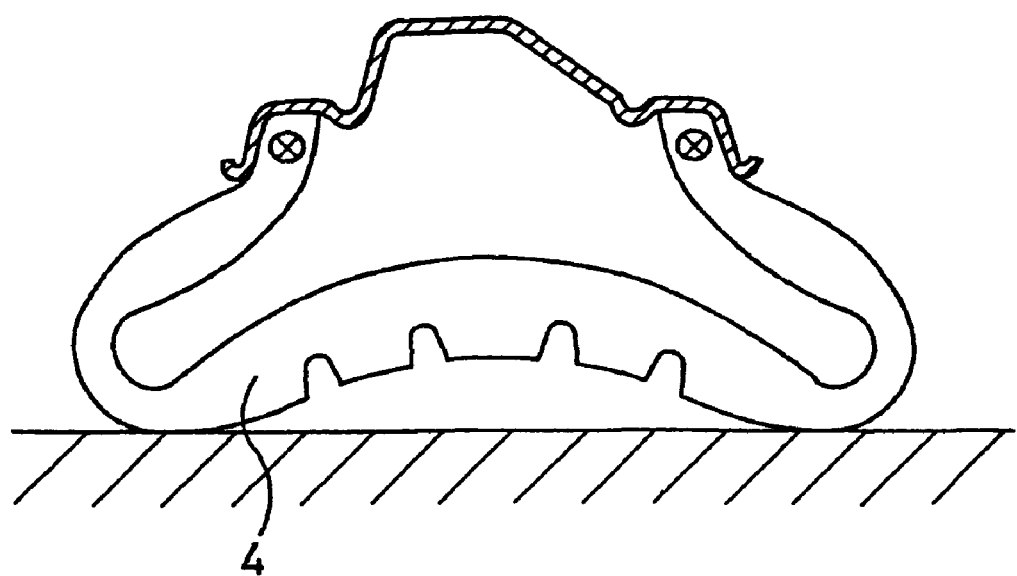
FIG. 5 is an explanatory view showing, in a cross section, how the tread portion is deformed when a conventional run flat tire runs while being punctured.

FIG. 4 is a plan view showing the arrangement relationship of belt layers and a tread surface of a run flat tire according to still another embodiment of the present invention.

The cross-sectional structure of this run flat tire is the same as that shown in FIG. 1. Three belt layers 8, 9, and 10 are disposed in the inner circumferential side of a tread portion 4 in such a manner that the cord directions of the innermost belt layer 8 and the intermediate belt layer 9 are arranged to intersect each other with respect to the equatorial plane of the tire. In addition, each of, the cord angle α of cords 8c constituting the innermost belt layer 8 with respect to the circumferential direction of the tire, and the cord angle γ of cords 10c constituting the outermost belt layer 10 with respect to the circumferential direction of the tire, is set at 40° to 75°, and preferably 50° to 60°. On the other hand, the cord angle β of cords 9c constituting the intermediate belt layer 9 with respect to the circumferential direction of the tire is set at 0° to 35°, and preferably 20° to 30°.

As described above, each of the cord angles α and γ respectively of the innermost belt layer 8 and the outermost belt layer 10 is set to be a high angle of 40° to 75°, while the cord angle β of the intermediate belt layer is set to be a low angle of 0° to 35°. Accordingly, as the entire belt layers, the out-of-plane stiffness in the width direction is secured in a balanced manner while an increase in out-of-plane stiffness in the circumferential direction is suppressed. This makes it possible to increase the compression stiffness of the tread portion in the width direction. This belt arrangement makes it possible to enhance the ride comfort in running on general road surfaces and the driving stability in running on snowy road surfaces at the time when the tire is not punctured, and also enhance the maneuverability on icy road surfaces by suppressing the buckling phenomenon in run-flat running.

When one of the cord angle α of the innermost belt layer 8 and the cord angle γ of the outermost belt layer 10 is below the above-described range, the out-of-plane stiffness in the circumferential direction becomes too large as compared with the out-of-plane stiffness in the width direction, as the entire belt layers. Accordingly, the maneuverability on icy road surfaces in run-flat running is deteriorated. By contrast, when one of the cord angle α of the innermost belt layer 8 and the cord angle γ of the outermost belt layer 10 exceeds the above-described range, the out-of-plane stiffness in the width direction becomes too large as compared with the out-of-plane stiffness in the circumferential direction, as the entire belt layers. Accordingly, although the maneuverability on icy road surfaces in run-flat running is maintained, the ride comfort in running on general road surfaces and the driving stability in running on snowy road surfaces at the time when the tire is not punctured are deteriorated.

In the present embodiment, the relation between the cord angle α of the innermost belt layer 8 and the cord angle γ of the outermost belt layer 10 may be set to satisfy α≧γ. This setting makes it possible to keep a favorable balance between the out-of-plane stiffness in the circumferential direction and the out-of-plane stiffness in the width direction, as the entire belt layers. As a result, it is possible to further ensure the favorable balance between the ride comfort in running on general road surfaces and the driving stability in running on snowy road surfaces at the time when the tire is not punctured, and the maneuverability on icy road surfaces in run-flat running.

A steel cord, or the above-described organic fiber cord having a high strength and a high modulus of elasticity may be used for the cords 8c, 9c, and 10c constituting the belt layers 8, 9, and 10. It is preferable that a steel cord be used for each of the cords 8c constituting the innermost belt layer 8 and the cords 10c constituting the outermost belt layer 10. This makes it possible to reliably secure the out-of-plane stiffness in the width direction, as the entire belt layers, and thus to reliably increase the compression stiffness of the tread portion 4 in the width direction. Accordingly, the maneuverability on icy road surfaces can be enhanced by reliably suppressing the bucking phenomenon in run-flat running.

In the embodiment shown in FIG. 4, the cords 9c of the intermediate belt layer 9 and the cords 10c of the outermost belt layer 10 may be arranged to establish an arrangement relationship in which the cord direction of the intermediate belt layer 9 and the cord direction of the outermost belt layer 10 are inclined in the same direction with respect to the equatorial plane of the tire. This arrangement makes it easy to adjust, in accordance with the required characteristics of the tire, the balance between the ride comfort in running on general road surfaces and the driving stability in running on snowy road surfaces at the time when the tire is not punctured, and the maneuverability on icy road surfaces in run-flat running. In addition, this arrangement is advantageous in terms of the durability of the belt layers.

It should be noted that, in accordance with the size or the requirement characteristics of the tire, the above-described arrangement relationship between the intermediate belt layer 9 and the outermost belt layer 10 may be set in such a manner that the cord directions of the intermediate belt layer 9 and the outermost belt layer 10 are inclined respectively in directions opposite to each other with respect to the equatorial plane of the tire.

As described above, in the run flat tire of the present invention, the three belt layers are disposed in the tread portion. In addition, the intermediate belt layer and the outermost belt layer, or the innermost belt layer and the outermost belt layer are arranged in such a manner that the cord direction of each belt layer is inclined at a high angle to the circumferential direction of the tire. In this manner, the out-of-plane stiffness in the width direction is sufficiently ensured. Accordingly, there is no need to use, as a tread rubber to be disposed in the tread portion, a rubber having a high hardness, which would otherwise be used for the purpose of increasing the compression stiffness in the width direction to enhance the run-flat running performance.

In other words, in the run flat tire of the present invention, it is possible to use, as at least a cap rubber of the tread rubber, a rubber having a low hardness as compared with that of the conventional tires. The disposing of the cap rubber having a low hardness enhances the ride comfort in running on general road surfaces and also the driving stability on snowy road surfaces at the time when the tire is not punctured. It is preferable the cap rubber has a JIS A hardness of 40 to 50, and preferably 43 to 48, at a temperature of 0° C. If the JIS A hardness is less than 40, it is difficult to ensure a favorable maneuverability on icy road surfaces in run-flat running. Note that, the JIS A hardness is the hardness of a rubber measured at a temperature of 0° C. by using a type A durometer in conformity with JIS K6253.

The first one of the above-described run flat tires of the present invention is configured as follows.

Specifically, the three belt layers are disposed on the outer side of the carcass layer in the tread portion. Moreover, the cord angles of the three belt layers with respect to the circumferential direction of the tire are set so that the innermost belt layer has a cord angle of 15° to 30°, that the intermediate belt layer has a cord angle of not less than 40°, and that the outermost belt layer has a cord angle of 35° to 70°. On the other hand, the second one of the run flat tires of the present invention is configured as follows. Specifically, the innermost belt layer and the intermediate belt layer are arranged in such a manner that the cord directions of the respective belt layers are inclined respectively in directions opposite to each other with respect to the equatorial plane of the tire. In addition, the cord angles of the respective three belt layers with respect to the circumferential direction of the tire are set so that the innermost belt layer and the outermost belt layer each have a high angle of 40° to 75°, and that the intermediate belt layer has a low angle of 0° to 35°. Each of these run flat tires enhances the ride comfort in running on general road surfaces and the driving stability in running on snowy road surfaces at the time when the tire is not punctured, and also enhances the maneuverability on icy road surfaces by suppressing the buckling phenomenon in run-flat running where the tire is punctured. Accordingly, both run flat tires are preferably employed particularly as a studless tire designed to run on icy road surfaces.

CONVENTIONAL EXAMPLE COMPARATIVE EXAMPLES 1 AND 2, EXAMPLES 1 TO 7

A conventional tire (Conventional Example), comparative tires (Comparative Examples 1 and 2), and tires of the present invention (Examples 1 to 7) were prepared. These tires each had a tire size of 205/55R16, a tire structure shown in FIG. 1, and a tread pattern shown in FIG. 2. However, these tires were different from one another in the cord angles α, β, and γ of the cords of the respective belt layers 8, 9, and 10, to the circumferential direction of the tire, as well as in the cord directions of the cords with respect to the equatorial plane of the tire, as shown in Table 1.

The following is to be noted in terms of each tire. The cords constituting each of the belt layers 8, 9, and 10 were steel cords. In addition, the widths of the innermost belt layer 8, the intermediate belt layer 9, and the outermost belt layer 10 were set at 190 mm, 180 mm, and 170 mm, respectively. Moreover, all the tires were set to have the same total cross-sectional area of the cords per unit width in each belt layer.

These 10 types of tires were evaluated, by testing methods explained below, in terms of the ride comfort in running on general road surfaces and the driving stability in running on snowy road surfaces at the time when the tire is not punctured, as well as the starting performance on icy road surfaces in run-flat running. The results of the evaluation are also shown in Table 1.

[Ride Comfort during Running on General Road Surface]

Each of the tires was mounted on a rim (16×7J), inflated to an air pressure of 230 kPa, and then mounted on each of the four wheel positions on the front and rear of a rear-wheel-drive vehicle with a displacement of 2500 cc. The vehicle was then driven on a test course with an asphalt road surface at an average speed of 60 km/h. In this way, a sensory evaluation was carried out by three test drivers. The results of the evaluation are shown by indices where the evaluation result of Conventional Example is taken as 100. The larger the index is, the more excellent the tire is in the ride comfort.

[Driving Stability during Running on Snowy Road Surface]

The above-described vehicle was driven for 10 km on a test course with a snowy road surface (temperature: −3° C. to −8° C., snow temperature: −4° C. to −8° C.) at an average speed of 40 km/h. In this way, a sensory evaluation was carried out by three test drivers. The results of the evaluation are shown by indices where the evaluation result of Conventional Example is taken as 100. The larger the index is, the more excellent the tire is in the driving stability.

[Starting Performance in Running on Icy Road Surface]

Of the tires mounted on the above-described vehicle, the air pressure of the front wheel on the driver's side was reduced to zero (0 kPa). Then, the running state of the vehicle was observed at the time when the vehicle was started on a test course with an icy road surface. The tire was thereby evaluated in the starting performance. The results of the evaluation are shown by indices where the evaluation result of the conventional tire is taken as 100. The larger the index is, the more excellent the tire is in the starting performance.

These two types of tires were evaluated, by the same testing methods as described above, in terms of the ride comfort in running on general road surfaces and the driving stability in running on snowy road surfaces at the time when the tire is not punctured, as well as the starting performance on icy road surfaces in run-flat running. The results of the evaluation are shown in Table 2, along with the result of the conventional tire (Conventional Example) shown in Table 1.

TABLE 2

|  |  | Conventional Example | Example 8 | Example 9 |
|---|---|---|---|---|
| Innermost Belt Layer 8 | Cord Angle α (°) | 25 | 25 | 25 |
|  | Cord Direction | Down to Left | Down to Left | Down to Left |
|  | Total Cross-sectional Area of Cords (Index) | 100 | 100 | 100 |
| Intermediate Belt Layer 9 | Cord Angle β (°) | 25 | 55 | 55 |
|  | Cord Direction | Down to Right | Down to Right | Down to Right |
|  | Total Cross-sectional Area of Cords (Index) | 100 | 100 | 125 |

TABLE 1

|  |  | Conventional Example | Comparative Example 1 | Comparative Example 2 | Example 1 | Example 2 | Example 3 | Example 4 | Example 5 | Example 6 | Example 7 |
|---|---|---|---|---|---|---|---|---|---|---|---|
| Innermost Belt Layer 8 | Code Angle α (°) | 25 | 25 | 25 | 25 | 25 | 25 | 25 | 25 | 25 | 25 |
|  | Cord Direction | Down to Left | Down to Left | Down to Left | Down to eft | Down to Left | Down to Left | Down to Left | Down to Left | Down to Left | Down to Left |
| Intermediate Belt Layer 9 | Cord Angle β (°) | 25 | 35 | 55 | 55 | 55 | 40 | 45 | 70 | 55 | 55 |
|  | Cord Direction | Down to Right | Down to Right | Down to Right | Down to Right | Down to Right | Down to Right | Down to Right | Down to Right | Down to Right | Down to Right |
| Outermost Belt Layer 10 | Cord Angle γ (°) | 50 | 50 | 75 | 50 | 50 | 50 | 45 | 50 | 40 | 65 |
|  | Cord Direction | Down to Right | Down to Right | Down to Right | Down to Right | Down to Left | Down to Right | Down to Left | Down to Right | Down to Right | Down to Right |
| Evaluation | Ride Comfort | 100 | 101 | 104 | 107 | 105 | 105 | 105 | 105 | 106 | 105 |
|  | Driving Stability on Snow | 100 | 99 | 98 | 103 | 105 | 102 | 103 | 102 | 104 | 102 |
|  | Starting Performance on Ice | 100 | 101 | 111 | 108 | 106 | 106 | 104 | 108 | 106 | 110 |

As can be seen from Table 1, the tires of the present invention (Examples 1 to 7) are improved, in a balanced manner, in terms of the ride comfort in running on general road surfaces and the driving stability in running on snowy road surfaces at the time when the tire is not punctured, as well as the starting performance on icy road surfaces in run-flat running, as compared with the conventional tire and the comparative tires.

EXAMPLES 8 AND 9

Examples 8 and 9 were prepared by varying, as shown in Table 2, the total cross-sectional area of the cords included in one of the outermost belt layer and the intermediate belt layer of the tire of Example 1. It should be noted that the total cross-sectional areas of the cords per unit width are shown by indices where the total cross-sectional area of the cords per unit area in the above-described conventional tire (Conventional Example) is taken as 100.

TABLE 2-continued

|  |  | Conventional Example | Example 8 | Example 9 |
|---|---|---|---|---|
| Outermost Belt Layer 10 | Cord Angle γ (°) | 50 | 50 | 50 |
|  | Cord Direction | Down to Right | Down to Right | Down to Right |
|  | Total Cross-sectional Area of Cords (Index) | 100 | 125 | 100 |
| Evaluation | Ride Comfort | 100 | 106 | 105 |
|  | Driving Stability on Snow | 100 | 105 | 106 |
|  | Starting Performance on Ice | 100 | 110 | 109 |

As can be seen from Table 2, the tires of the present invention (Examples 8 and 9) are improved, in a balanced manner, in terms of the ride comfort in running on general road surfaces and the driving stability in running on snowy road surfaces at the time when the tire is not punctured, as well as the starting performance on icy road surfaces in run-flat running, as compared with the conventional tire.

COMPARATIVE EXAMPLES 3 TO 5, AND EXAMPLES 10 TO 16

A conventional tire (Conventional Example), comparative tires (Comparative Examples 3 to 5), and tires of the present invention (Examples 10 to 16) were prepared under the same conditions as those of Example 1 except for the following points. Specifically, these tires were prepared by varying, as shown in Table 3, the cord angles α, β, and γ of the respective belt layers 8, 9, and 10 with respect to the circumferential direction of the tire as well as the cord direction of the cords thereof with respect to the equatorial plane of the tire, in the tire of Example 1.

These eleven types of tires were evaluated, by the above-described testing methods, in terms of the ride comfort in running on general road surfaces and the driving stability in running on snowy road surfaces at the time when the tire is not punctured. These eleven types of tires were also evaluated, by testing methods explained below, the starting performance, the braking performance, and the run-flat running performance, on icy road surfaces in run-flat running. The results of the evaluation are shown together in Table 3.

[Starting Performance and Braking Performance on Icy Road Surface]

Each of these tires was mounted on a rim (16×7J), inflated to an air pressure of 230 kPa, and then mounted on each of the four wheel positions on the front and rear sides of a rear-wheel-drive vehicle with a displacement of 2500 cc. Of the tires mounted on the above-described vehicle, the air pressure of the front wheel on the driver's side was reduced to zero (0 kPa). Then, a sensory evaluation was performed by three test drivers on the vehicle in terms of the starting state of the vehicle at the time when the vehicle was started, as well as the braking state thereof in the state where the vehicle was accelerated after the start on a test course with an icy road surface. The results of the evaluation are shown in the following manner. A case where the vehicle was able to start with no problem is indicated by O. The braking state (the wheel slip state, and the like, of the tires) of the tires after the start are shown by indices where the result of Conventional Example is taken as 100. The larger the index is, the more excellent the tire is in the braking performance.

[Run-Flat Running Performance]

Of the tires mounted on the above-described vehicle, the air pressure of the front wheel on the driver's side was reduced to zero (0 kPa). Then, a sensory evaluation was performed by three test drivers on the vehicle in terms of the driving stability of the vehicle when the vehicle was driven on a test course with an icy road surface. The tire was thereby evaluated in the Run-flat running performance. The results of the evaluation are shown by indices where the evaluation result of Conventional Example is taken as 100. The larger the index is, the more excellent the tire is in the running performance.

TABLE 3

|  |  | Conventional Example | Comparative Example 1 | Comparative Example 2 | Comparative Example 3 | Example 1 | Example 2 |
|---|---|---|---|---|---|---|---|
| Innermost Belt Layer 8 | Code Angle α (°) | 25 | 25 | 60 | 50 | 60 | 60 |
|  | Cord Direction | Down to Left | Down to Left | Down to Left | Down to Left | Down to Left | Down to Left |
| Intermediate Belt Layer 9 | Cord Angle β (°) | 25 | 25 | 10 | 25 | 25 | 25 |
|  | Cord Direction | Down to Right | Down to Right | Down to Right | Down to Right | Down to Right | Down to Right |
| Outermost Belt Layer 10 | Cord Angle γ (°) | 50 | 50 | 50 | 60 | 50 | 50 |
|  | Cord Direction | Down to Right | Down to Right | Down to Right | Down to Right | Down to Right | Down to Left |
| Tread Rubber (JIS A Hardness) |  | 54 | 48 | 54 | 54 | 54 | 54 |
| Evaluation | Ride Comfort | 100 | 102 | 103 | 102 | 105 | 104 |
|  | Driving Stability on Snow | 100 | 106 | 98 | 98 | 105 | 105 |
|  | Starting Performance on Ice | O | O | O | O | O | O |
|  | Braking Performance | 100 | 112 | 102 | 102 | 103 | 104 |
|  | Run-flat Running Performance | 100 | 93 | 106 | 111 | 108 | 110 |

|  |  | Example 3 | Example 4 | Example 5 | Example 6 | Example 7 |
|---|---|---|---|---|---|---|
| Innermost Belt Layer 8 | Code Angle α (°) | 75 | 60 | 60 | 60 | 50 |
|  | Cord Direction | Down to Left | Down to Left | Down to Left | Down to Left | Down to Left |
| Intermediate Belt Layer 9 | Cord Angle β (°) | 25 | 15 | 35 | 25 | 25 |
|  | Cord Direction | Down to Right | Down to Right | Down to Right | Down to Right | Down to Right |
| Outermost | Cord Angle | 50 | 50 | 50 | 50 | 50 |

TABLE 3-continued

| Belt Layer 10 | γ (°) Cord Direction | Down to Right | Down to Right | Down to Right | Down to Right | Down to Right |
|---|---|---|---|---|---|---|
| Tread Rubber (JIS A Hardness) | | 54 | 54 | 54 | 48 | 54 |
| Evaluation | Ride Comfort | 104 | 104 | 104 | 106 | 106 |
| | Driving Stability on Snow | 103 | 102 | 104 | 110 | 107 |
| | Starting Performance on Ice | ○ | ○ | ○ | ○ | ○ |
| | Braking Performance | 104 | 103 | 103 | 115 | 105 |
| | Run-flat Running Performance | 110 | 107 | 109 | 103 | 107 |

As can be seen from Table 3, the tires of the present invention are improved, in a balanced manner, in terms of the ride comfort in running on general road surfaces and the driving stability in running on snowy road surfaces at the time when the tire is not punctured, as well as the maneuverability (the starting performance, the braking performance, and the running performance) on icy road surfaces in run-flat running where the tire is punctured, as compared with the conventional tire and the comparative tires.

What is claimed is:

1. A run flat tire comprising:
a carcass layer laid between bead cores buried respectively in a pair of left and right bead portions;
hard rubber layers each having a substantially crescent shape in a cross section, and being disposed respectively in sidewall portions; and
three belt layers disposed on an outer circumferential side of the carcass layer in a tread portion, wherein;
as to the three belt layers, an innermost belt layer extends in one cord direction at a cord angle α set at 15° to 30° with respect to a circumferential direction of the tire, a cord angle β of an intermediate belt layer with respect to the circumferential direction of the tire is set at not less than 40°, and a cord angle γ of an outermost belt layer with respect to the circumferential direction of the tire is set at 45° to 70°,
the innermost belt layer is disposed directly on the carcass layer, the intermediate belt layer is disposed directly on the innermost belt layer, the outermost belt layer is disposed directly on the intermediate belt layer, and a belt cover layer is disposed directly on the outermost belt layer,
the cord direction of the innermost belt layer and a cord direction of the intermediate belt layer are arranged to be inclined respectively in directions opposite to each other with respect to an equatorial plane of the tire, and
the cord direction of the intermediate belt layer and a cord direction of the outermost belt layer are arranged to be inclined in the same direction with respect to the equatorial plane of the tire.

2. The run flat tire according to claim 1 wherein an angular difference between the cord angle β of the intermediate belt layer and the cord angle γ of the outermost belt layer is set to be within 20°.

3. The run flat tire according to claim 1 wherein the cords constituting at least one of the intermediate belt layer and the outermost belt layer are steel cords.

4. The run flat tire according to claim 1 wherein a total cross-sectional area of cords per unit width in at least one of the intermediate belt layer and the outermost belt layer is set to be 1.2 to 1.5 times of a total cross-sectional area of cords per unit width in the innermost belt layer.

5. The run flat tire according to claim 1 wherein the belt cover layer includes an organic fiber cord that extends in the circumferential direction of the tire.

6. The run flat tire according to claim 1 wherein the belt cover layer extends in the tire width direction to completely cover both edges of at least the outermost belt layer.

7. The run flat tire according to claim 1 wherein the belt cover layer extends in the tire width direction to completely cover both edges of at least the outermost belt layer and the intermediate belt layer.

8. The run flat tire according to claim 1 wherein the belt cover layer extends in the tire width direction to completely cover both edges of each of the three belt layers.

9. The run flat tire according to claim 1 wherein the cord angle α set to 20° to 30°.

10. The run flat tire according to claim 1 wherein the cord angle β is set at not less than 45°.

* * * * *